Jan. 27, 1970

C. E. WILLIAMS 3,491,810

APPARATUS FOR HARVESTING TIMBER

Filed Sept. 15, 1967

INVENTOR
CHARLES E. WILLIAMS

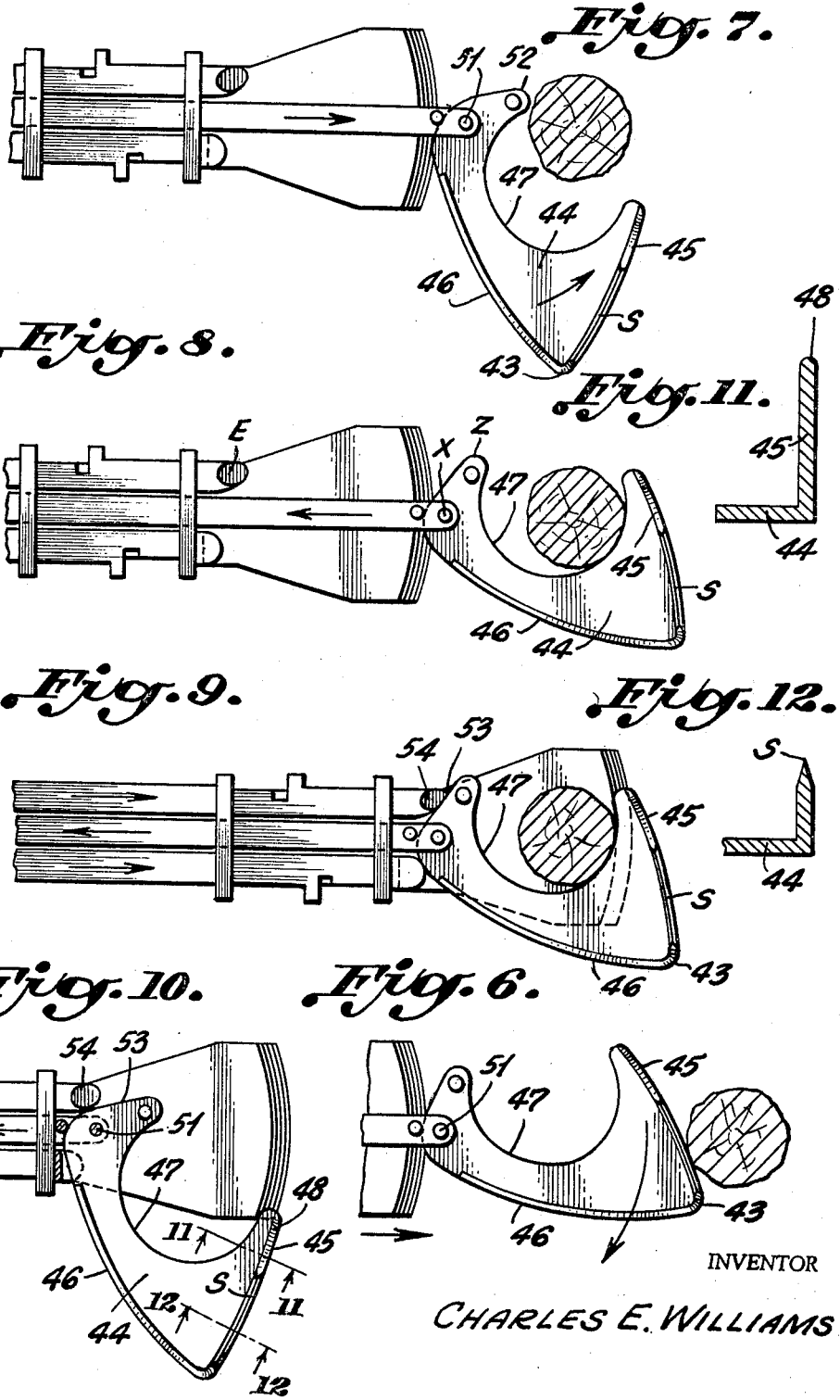

Jan. 27, 1970   C. E. WILLIAMS   3,491,810
APPARATUS FOR HARVESTING TIMBER
Filed Sept. 15, 1967   8 Sheets-Sheet 6
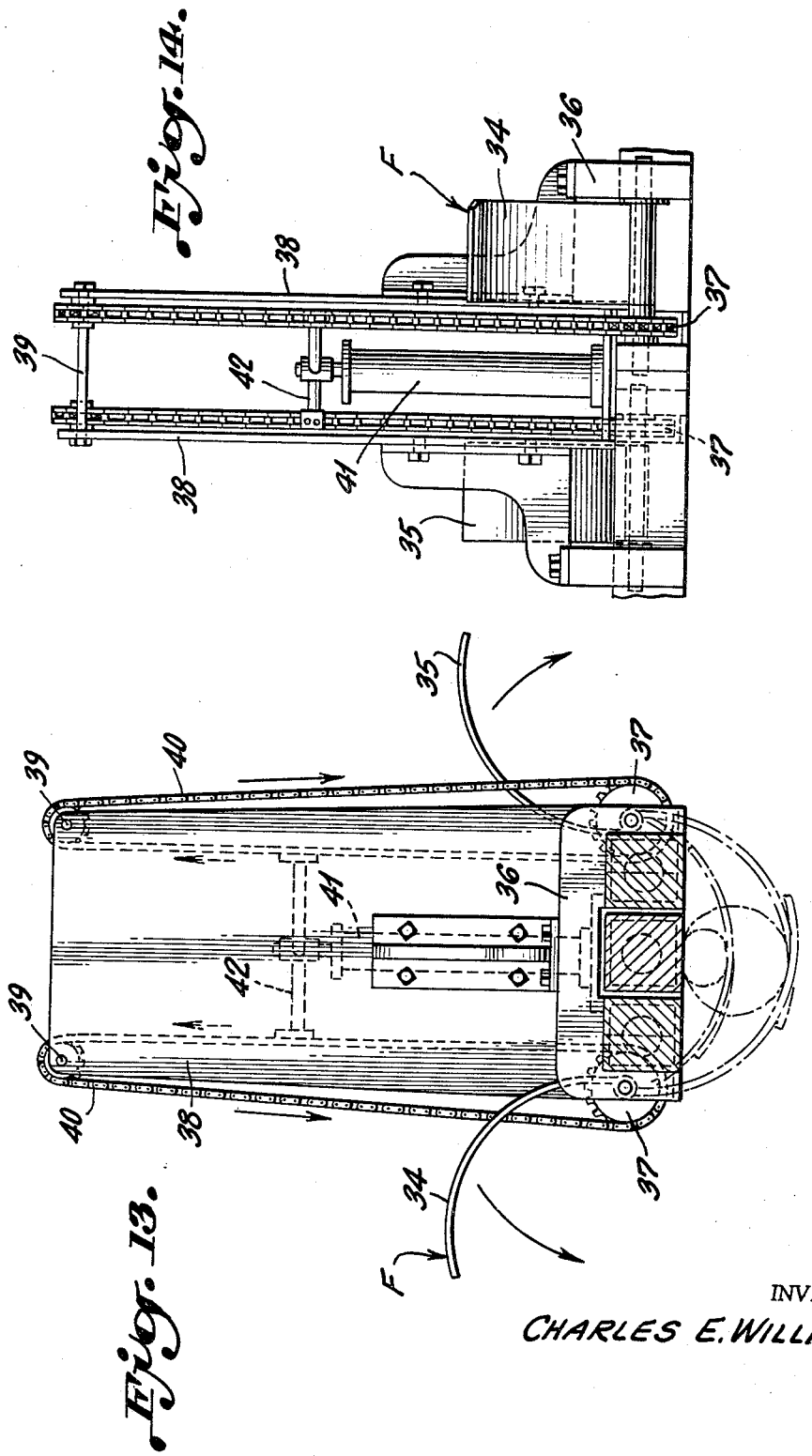
INVENTOR
CHARLES E. WILLIAMS

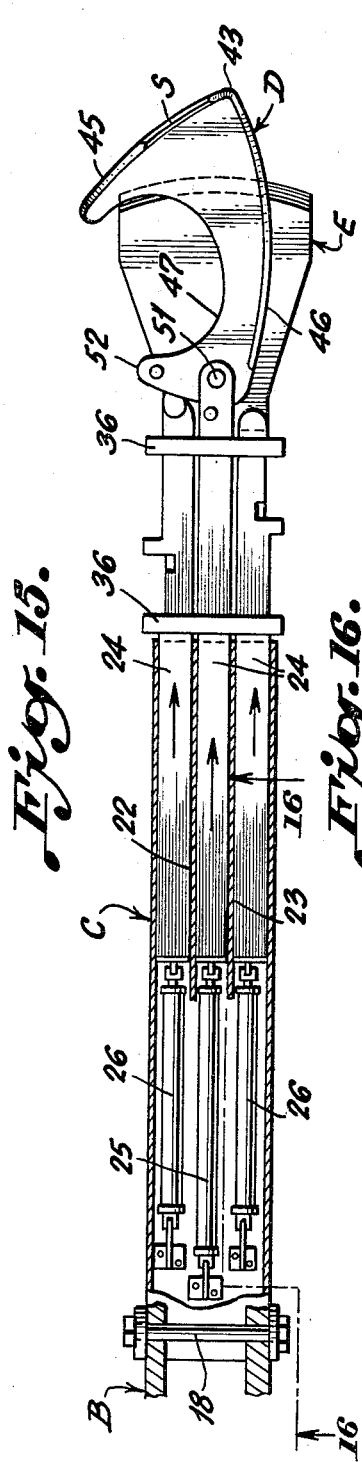
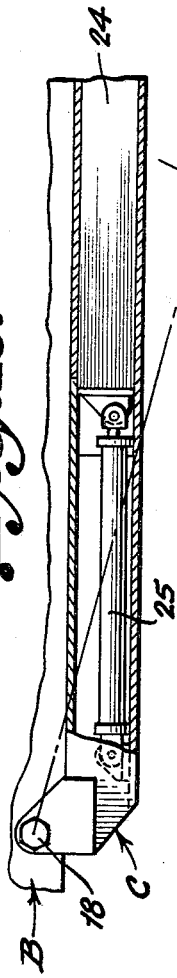
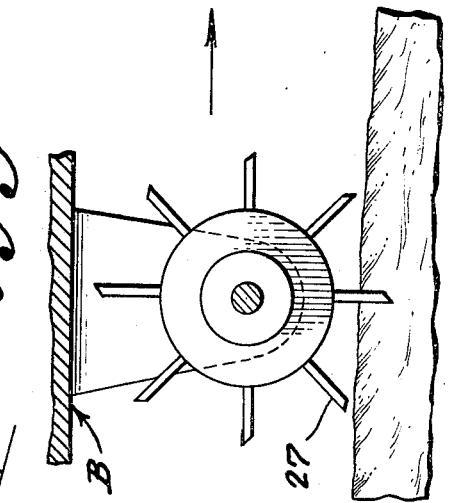
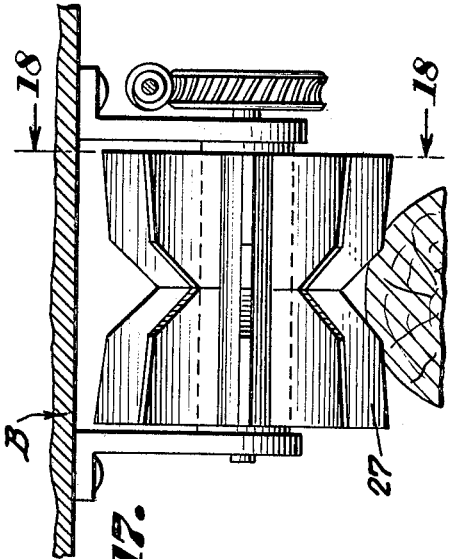
INVENTOR
CHARLES E. WILLIAMS

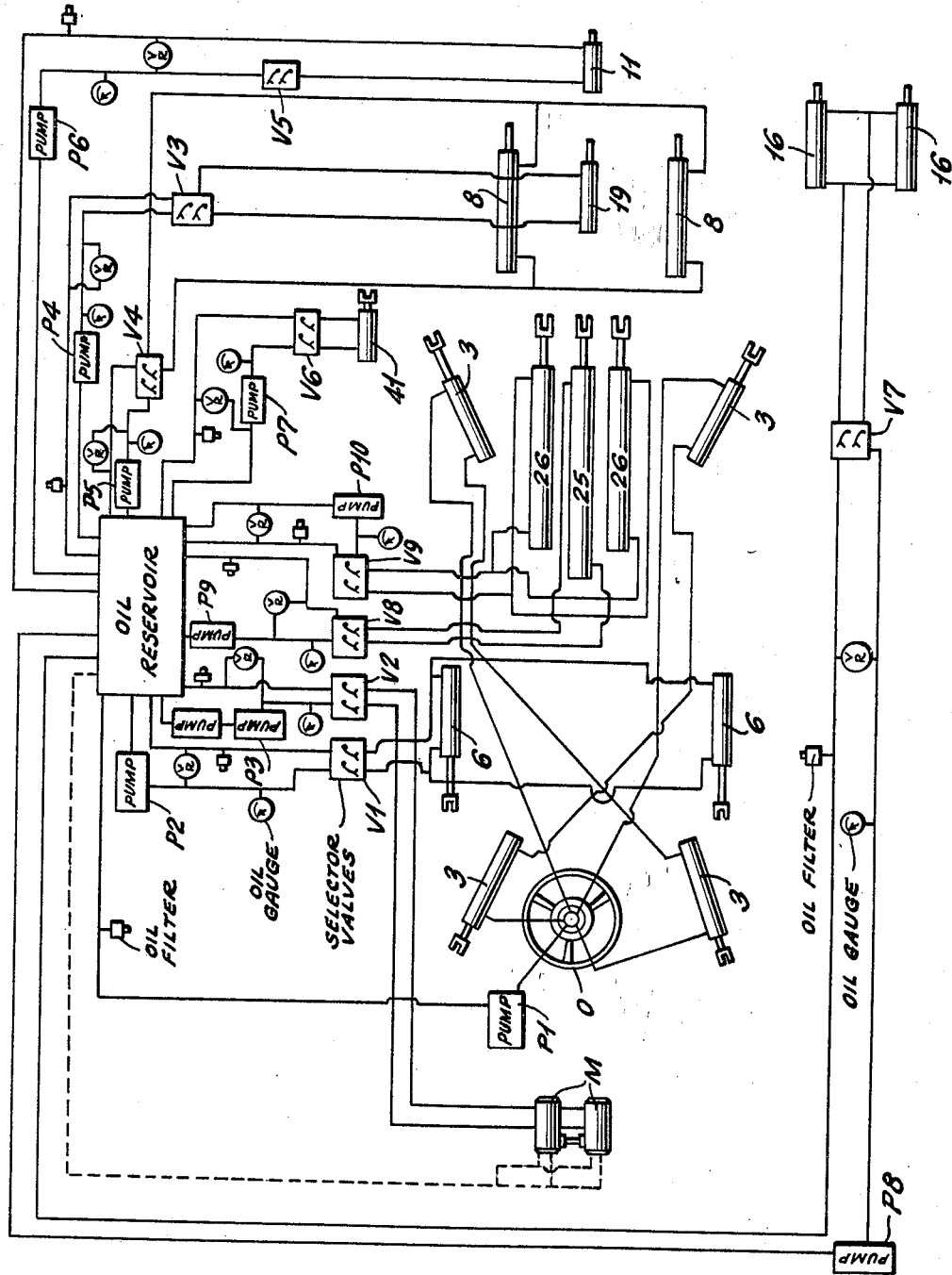

United States Patent Office 3,491,810
Patented Jan. 27, 1970

3,491,810
APPARATUS FOR HARVESTING TIMBER
Charles E. Williams, Savannah, Ga., assignor to Continental Can Company, Inc., New York, N.Y., a corporation of New York
Filed Sept. 15, 1967, Ser. No. 668,128
Int. Cl. B27m 1/00
U.S. Cl. 144—34                                                   14 Claims

ABSTRACT OF THE DISCLOSURE

There is disclosed a timber harvesting apparatus which includes a self-propelled frame, a chassis carried by such frame and a housing structure pivotally connected to one end of the chassis for vertical swinging movement with respect thereto. Further, automatically operable tree engaging and grasping means and shearing means are carried by said housing structure and mounted for longitudinal reciprocating movements with respect to said housing structure and with respect to each other. These last two means are so constructed and arranged that the tree grasping and engaging means automatically opens and closes behind a standing tree in response to engagement with the front face of such a tree and then can be reversely moved to pull against the rear face of such a tree while the shearing means moves longitudinally toward such grasping means so that force is applied in opposite directions at approximately the same level to assist in minimizing the shearing force required. Further a pushing means is carried by the frame for engagement with the tree at a location sufficiently above the shearing location to insure that the tree is felled directionally forward of the self-propelled frame.

---

Figure 1:
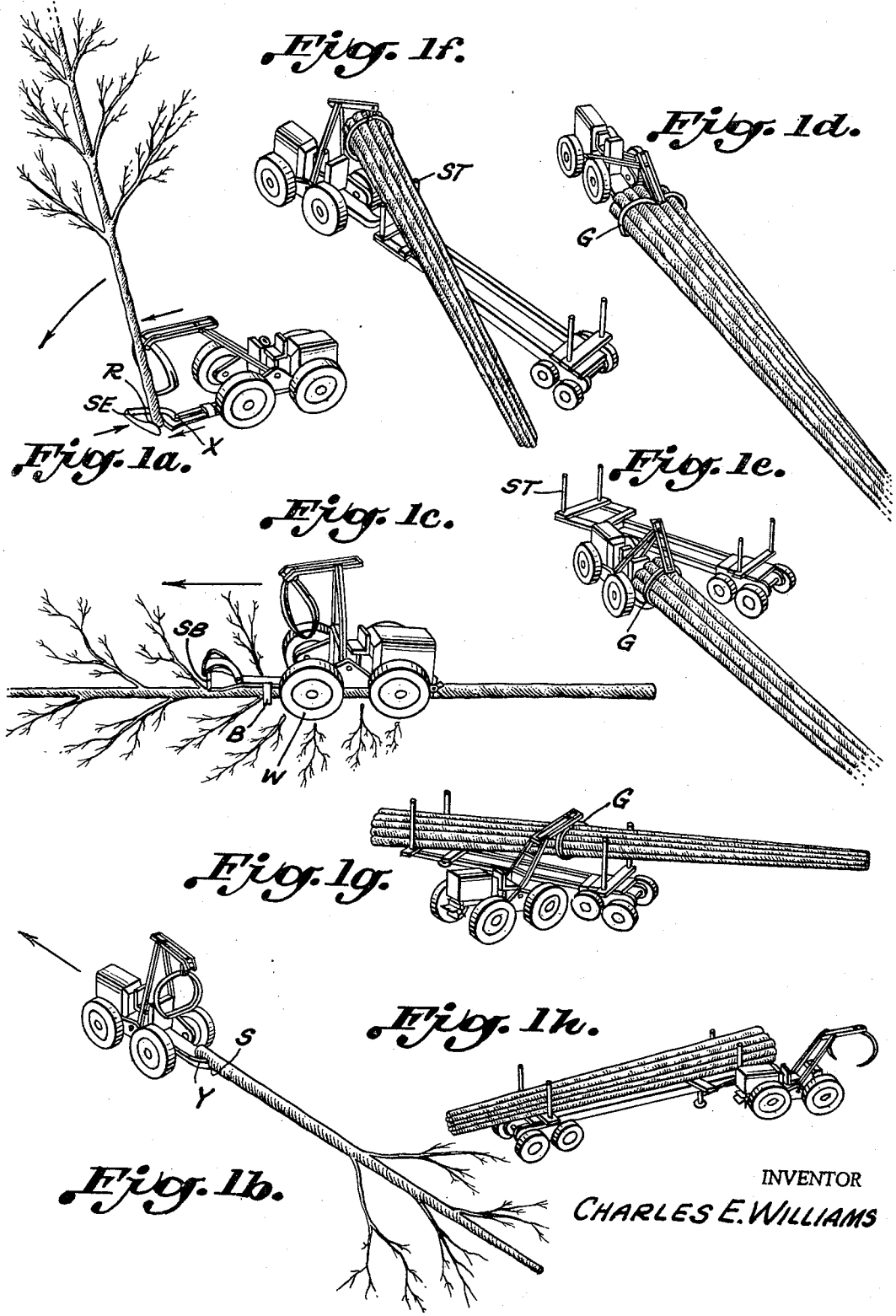

The present invention relates broadly to the harvesting and transporting of forest products, especially a timber harvesting and transporting method, system and apparatus which is particularly intended for use in the production of pulp wood, although it is equally advantageous in the production of saw logs and the like.

Specifically, this application is an improvement in such timber harvesting and transporting method, system and apparatus over that embodied in prior filed application Ser. No. 321,836 filed Nov. 6, 1963 (and now Patent No. 3,340,912 dated Sept. 12, 1967) and entitled "Timber Harvesting and Transporting Method, System and Apparatus," with respect to which I am co-inventor with one Frederick L. Dillingham.

As disclosed in such prior filed application, the timber industry has long been in need of apparatus and method aspects which would, in effect, fell, delimb and bunch tree lengths in an expeditious economical manner with a minimum of labor.

Various proposals have been advanced in the art dealing with different arrangements for felling a tree, delimbing the same and manipulating the felled delimbed tree length into a position to be loaded on a logging conveyance for transport to either a point of utilization or a storage yard.

The present invention, therefore, has for an object to provide an improved method and apparatus whereby standing timber can be directionally felled by a reciprocable shear while tensioning the tree fibers, delimbed by relative longitudinal movement between such felled tree and delimbing means and, in addition, such felled length of merchantable timber, after the top has been severed, can be readily moved to what is termed a bunching position.

It is a further object of the invention to provide a mobile vehicle which mounts operative tree felling means including an automatically operable grasping mechanism which opens and closes around the back side of the tree, a shearing means movable longitudinally of the axis of the vehicle which simultaneously cooperates with said grasping mechanism to exert a shearing force at or approximately at ground level and a pushing means which engages the tree at a location sufficiently above the point of application of shearing force to insure that when the pushing means and the shearing means simultaneously operate the tree is felled directionally forwards of the mobile vehicle.

It is a further and more specific object to provide a method of directionally felling a standing tree which comprises automatically engaging, in the direction of movement of a vehicle, the rear side of a standing tree at or near ground level, applying a shearing force across the front face of such tree approximately at the level at which the rear face of such tree is grasped, while simultaneously exerting a pulling force on said rear face and a pushing force on the front face of the standing tree at a location above the point of application of such shear force such that the fibers of such tree are in tension so as to minimize the amount of force required to shear the tree at or approximately at ground level.

It is a further object of this invention to provide apparatus including a mobile frame which incorporates four driving wheels, a driving mechanism, the frame including two longitudinally extending side frame components, a horizontally disposed pivot means located between the axle means for the respective fore and aft wheels, a chassis carried by such horizontal pivot means for vertical tilting movement thereabout, a swingable pushing means carried by such chassis to engage a tree and apply pushing force thereto at a height above the ground in excess of the vertical dimensions of the apparatus, said chassis also supporting in depending relation a vertically swingable housing structure which supports and carries for relative longitudinal movement an automatically operable tree-engaging and grasping means and a shearing means, such last two means being constructed and arranged so that the tree grasping means automatically opens in response to engagement with the front face of the standing tree and then can be reversely moved to pull against the rear face of such tree, while said shearing means moves longitudinally toward such grasping means so that force is applied at opposite directions at approximately the same level to assist in minimizing the shearing force require, in combination with the application of pushing force at a level vertically displaced upwards from the point of application of such shearing force.

It is a further and still more specific object to provide a method as set forth in the immediately preceding paragraph wherein trees of limited diameter up to approximately 18" can be adequately severed at or near ground level without applying a pushing force at a location above the point of application of such shearing force.

It is another object of the invention to provide apparatus which in addition to the basic mobile frame having an oscillatable chassis or sub-frame includes a swingable housing supported in depending relation beneath said sub-frame which carries not only the reciprocable tree grasping means and tree shearing means but also carries tree delimbing means.

A still more specific object is to provide in conjunction with the apparatus as set forth in the immediately preceding object a fluted driven roll carried at the end of the oscillatable chassis or sub-frame remote from said shearing means and which responsive to oscillation of said sub-frame engages the upper surface of a felled tree length to assist in providing tractive force for moving the mobile frame relative to a felled length, also when said roll is held in non-rotary condition against the upper surface of such felled length it provides a base of reaction to permit extension of said shearing means and delimbing means relative to the mobile frame, when the latter is stationary, to delimb large limbs of a diameter of at least approximately 6".

It is a further specific object to provide in association with such oscillatable chassis or sub-frame, a tree grasping means which comprises a unitary hook-shaped arm mounted for oscillation about a vertical axis lying approximately along the longitudinal axis of such mobile frame and having a leading end extending on an arc rearwardly toward such frame when said hook-shaped arm and leading end is in closed condition, said leading end having a vertical wall adapted to engage the front face of a standing tree so as to cam open said hook-shaped arm, said hook-shaped arm having a trailing end adjacent the location of the vertical axis about which it swings that engages the front face of such tree to close said leading end to provide another camming action to close said leading end behind the rear face of such tree, whereupon reverse movement of such hook-shaped arm will apply a pulling force against the rear face of the tree.

Consistent with the foregoing object and supplementary therewith it is a further specific object to provide a method and apparatus for severing standing trees sufficiently close to ground level as will permit unimpeded movement of a harrow over an area where trees have been felled or harvested so as to prepare the ground of such area for tree planting at minimum cost.

Figure 2:
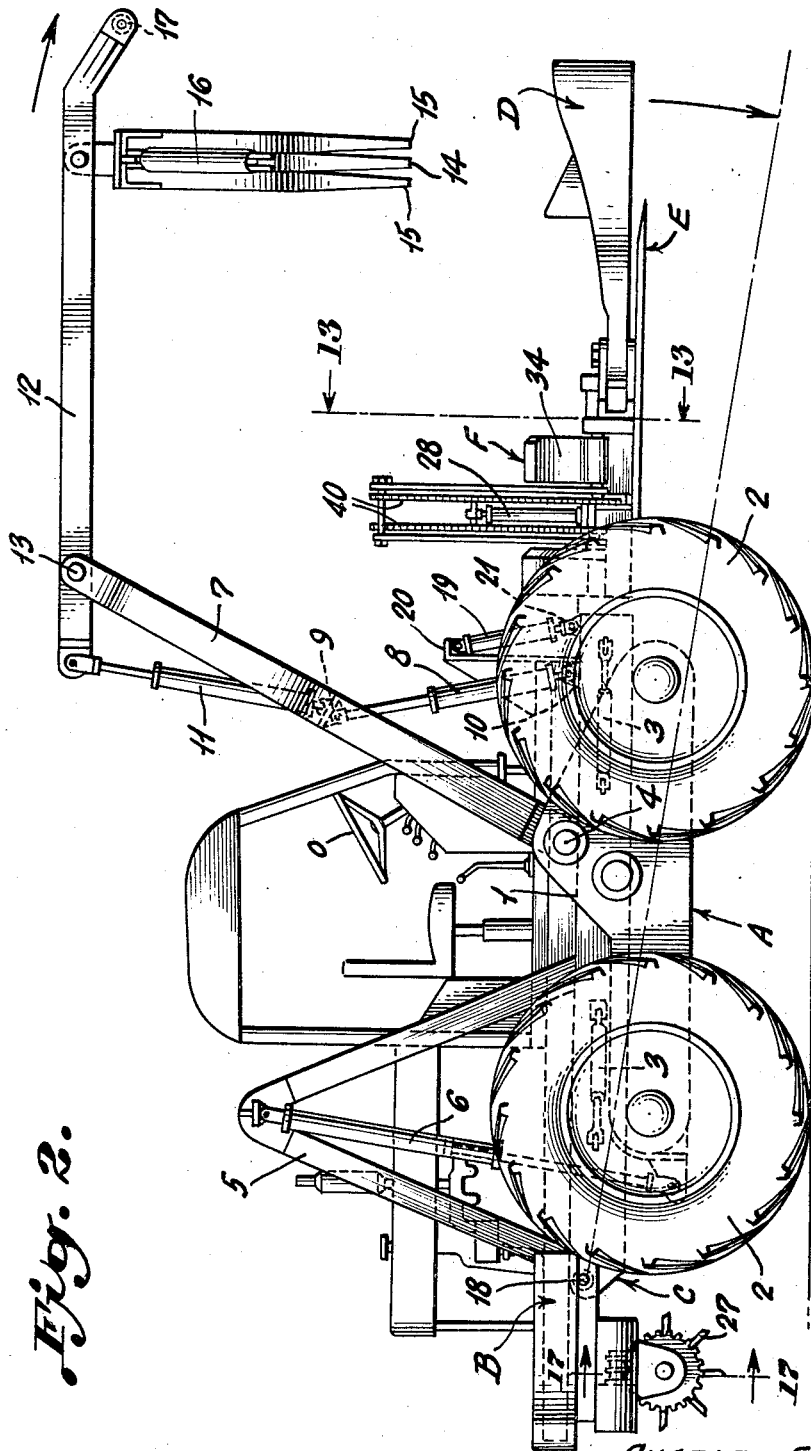
Figure 3:
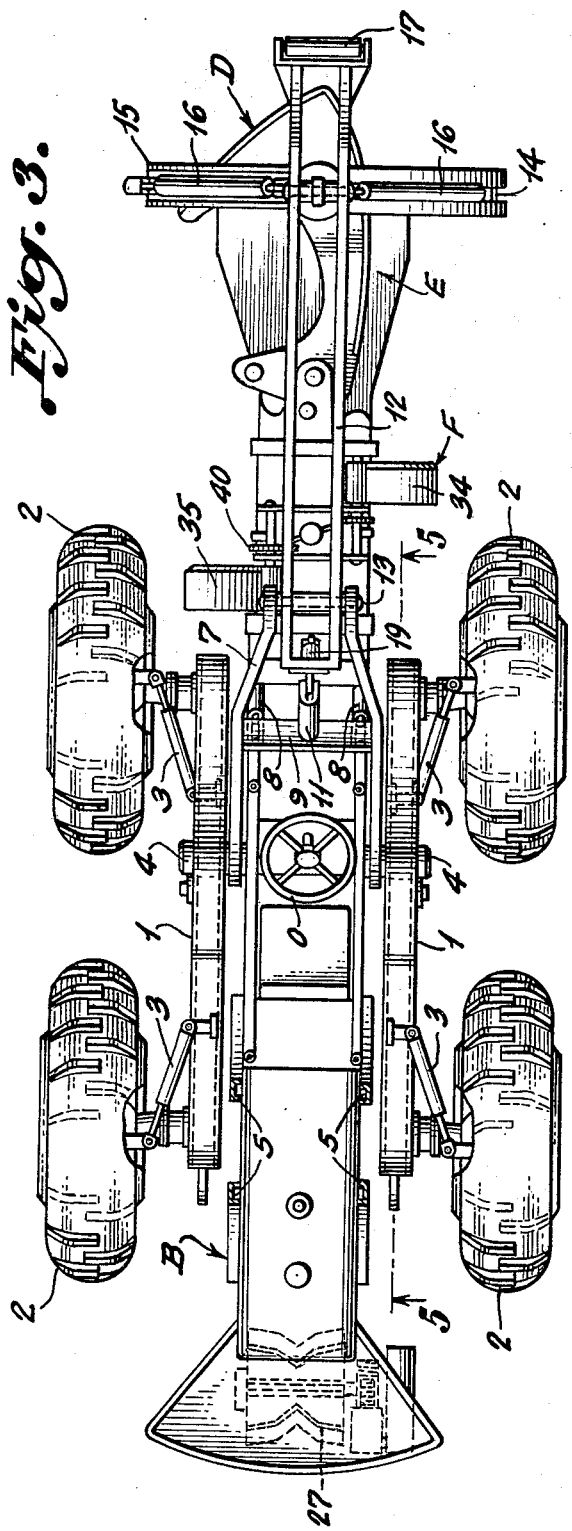
Figure 4:
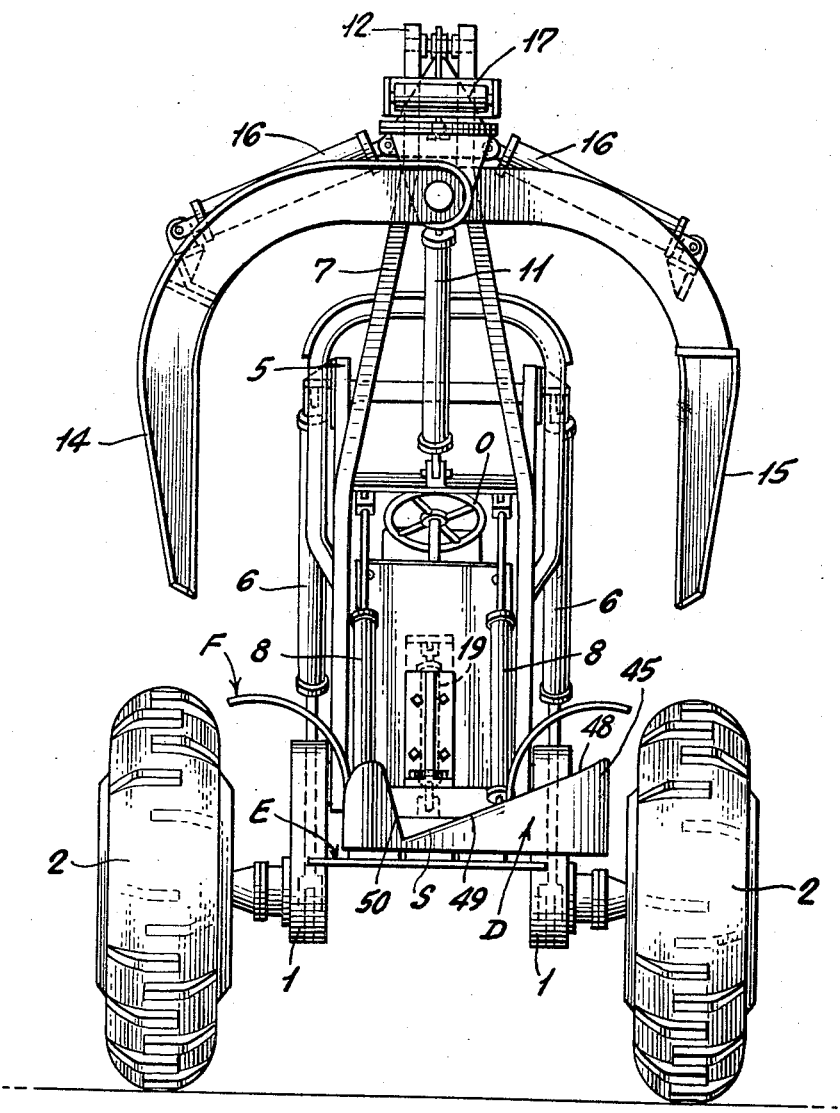

Further and more specific objects will be apparent from the following description taken in connection with the accompanying drawings, in which:

FIGURE 1a is a diagrammatic perspective view illustrating the apparatus of the invention in a directional tree felling operation, FIGURE 1b is a similar view illustrating the apparatus moving the felled tree length to what is termed bunching location, FIGURE 1c is a similar view illustrating the apparatus moving longitudinally of such felled tree to effect delimbing, FIGURE 1d is a perspective view illustrating the apparatus grapsing a group, termed bunch in the logging trade, of felled delimbed tree lengths, and FIGURES 1e through 1h are similar views illustrating the loading of such group of lengths termed a bunch on a logging trailer, FIGURE 2 is a side elevational view of the apparatus of this invention, FIGURE 3 is a top plan view of the apparatus shown in FIGURE 2, FIGURE 4 is a front elevational view of the apparatus of the invention, FIGURE 5 is a vertical sectional view taken along line 5—5 of FIGURE 3, FIGURES 6 to 9 are fragmentary top plan views illustrating the operation of the tree grasping means and the tree shearing means, FIGURE 10 is a view similar to FIGURES 6 to 9 but illustrating the hook in open position assumed upon maximum retraction of the grasping means to cause a felled length to fall off the grasping means or hook at the bunching position, FIGURE 11 is a sectional view taken along line 11—11 of FIGURE 10 illustrating the rounded portion of the front wall of the grasping means or hook, FIGURE 12 is a sectional view taken along line 12—12 of FIGURE 10 illustrating the inclined sharpened upper edge of the front wall of the grasping means or hook, FIGURE 13 is a sectional view taken along line 13—13 of FIGURE 2 illustrating the delimbing blades and the operating means therefor, FIGURE 14 is a side elevational view of the structure shown in FIGURE 13, FIGURE 15 is a fragmentary view partly in section and partly in elevation illustrating the housing or belly pan structure that accommodates the tree grapsing means and shearing means, FIGURE 16 is a cross-sectional view taken along line 16—16 of FIGURE 15 but illustrating the parts on a somewhat larger scale, FIGURE 17 is a sectional view taken along line 17—17 of FIGURE 2 and illustrating the traction roller, FIGURE 18 is a sectional view taken along line 18—18 of FIGURE 17 and further illustrating such traction roller, FIGURE 19 is a schematic diagram illustrating the hydraulic circuitry for controlling and operating the various movable components of the apparatus.

As illustrated particularly in FIGURES 2 and 3, the apparatus of this invention comprises a mobile frame generally designated A which includes opposite longitudinally extending side frame components 1. These side frame components support a chain drive mechanism, as diagrammatically shown in FIGURE 5, for rotating the wheels 2 in pairs of opposite sides of the longitudinal axis of the mobile frame. Each wheel is of the independently steerable type, there being suitable hydraulic cylinder and piston arrangements such as shown at 3 for turning the wheels in a desired steering position. Intermediate the side frames 1 are mounted pivot means 4 which support a chassis or sub-frame generally denoted at B. This chassis supports the driving engine, pumps and reservoir for the hydraulic circuitry described hereinafter. The chassis at the rear end thereof carries ap air of upwardly extending inverted V-shaped braces 5 and connected between the upper portion of each brace and the rear end of each side frame 1 is a hydraulic cylinder and piston unit 6. By extending or retracting these units the chassis can be oscillated around the pivots 4 so as to dispose either the components at the forward end of the chassis, that is, the shearing means and tree grasping means, at different distances with respect to the ground or, alternatively, to tilt the rear end of the chassis downwards to apply the traction roller described hereinafter against the upper surface of a felled tree length. About the pivot means 4 are mounted the lower ends of an A-frame component 7, this A-frame being mounted for swinging movement about the axis of pivot means 4 in accordance with the actuation of hydraulic piston and cylinder units 8 pivotally connected bectween a horizontal strut 9 on the A-frame and suitable base brackets 10. On the upper side of the cross strut or brace 9 is mounted a cylinder and piston unit 11, the other end of which is connected to a boom arm 12 that is pivoted at 13 to the upper end of the A-frame. The outer end of the boom arm carries grappel arms 14 and 15 mounted by swivel means denoted at S so that they are freely swingable and respectively acttuated between opened and closed condition by a pair of hydraulic piston and cylinder units 16. The forward end of the boom arm carries a roller 17 that engages against a tree in a tree felling operation to apply pushing force in the direction of felling.

The roller 17 is a preferred arrangement at the outer end of the boom arm, although the invention is not to be limited to the use of a roller since tests have indicated that a rigid cross member at the ends of the side frame elements of the boom arms will operate. The freely rotatable roller, however, is a preferable structural arrangement.

The third major component of the apparatus of this invention, in addition to the ground supporting mobile frame A and the oscillatable chassis B, is a housing or what could be termed a belly pan unit or sub-frame C. This unit is pivotally mounted about an axis 18 beneath the rear end of the chassis. At the forward end of the chassis is a hydraulic piston and cylinder unit 19, the opposite ends of which unit are respectively pivotally connect to a brace structure 20 carried on the upper surface of the chassis frame component and a mounting location 21 on the upper surface of the housing or belly pan unit. This unit is of generally rectangular configuration in cross-section, as shown in section in FIGURE 15. There are vertically disposed partitions 22 and 23 which divide the forward end of the housing unit into three adjacent compartments. Within each compartment is a a square-shaped frame 24. Behind each of these frames and pivotally connected thereto are the pistons of piston and cylinder units arranged to include an inner piston and cylinder unit 25 and a coupled pair of outer piston and cylinder units 26. These square-shaped frames carry and actuate the tree grasping or hook means D and the shearing blade E, respectively. The outermost pair of such frames 24 likewise support and carry the blades and operating means for the tree delimbing jaws F, shown more particularly in FIGURES 13 and 14. The centrally located piston and cylinder unit 25 reciprocates the hook means D while the pair of piston and cylinder units 26 conjointly cooperate to reciprocate and drive the shear balde means E, as well as longitudinally displace the delimbing blades as well be described hereinafter.

At the rear end of the chassis B is mounted a vaned or fluted roll, the details of which appear more readily in FIGURE 17. The vanes of this roll are provided with V-shaped cut-outs or depressions at the central portion thereof so that when cylinder and piston units 6 are actuated to depress or tilt the rear end of the chassis downwardly about axis 4 the vanes of the roller 27 will bear against and dig into the upper surface of a felled tree length. The roller can be driven in opposite directions by a powerful hydraulic motor and worm gear drive, as described hereinafter. Thus, with the roller in engagement with the upper surface of a felled tree length and driven, a positive traction is provided between the felled length and the apparatus. Also this arrangement ensures that the vaned roller can be held stationary against the upper surface of the tree to provide point of reaction when the outremost pair of piston and cylinder units 26 are actuated to extend the shear blade in a shearing action and likewise when the delimbing blades are swung downward to operative position to extend such blades longitudinally forward of the mobile frame when the latter is stationary to apply a shearing force to any large limbs to be delimbed. However, in most instances, longitudinal movement of the mobile frame with the traction roller being driven in the direction of movement of such frame and the delimbing blades moved into operative position it is merely necessary to, in effect, drive the mobile frame along the tree length in a straddled relation to thoroughly delimb a felled tree length. To sever the top of a felled length further force is applied to the hydraulic cylinder and piston unit 28 to squeeze the delimbing blades closer together.

To effect forward and reverse drive of the mobile frame through a suitable gearing arrangement, not shown, the engine shaft actuates a differential arranged to provide split power train, each end of which drives a sprocket shaft located within the pivot bushing 4 that pivotally supports the chassis relative to the side frame components 1. This imparts reverse drive to the drive sprocket 29 to drive chain 30 which, in turn, is trained over sprockets 31 and 32 on the respective fore-and-aft wheels on each side of the mobile frame. Idler tensioning sprocket 33 is fixedly supported in engagement with the chain to insure proper tension and tractive force in this chain drive relationship, it thus being understood that under control of the operator all four wheels can be driven forwards or backwards, the wheels on one side held stationary while those on the opposite side are driven either forwards or backwards. In other words, the drive relationship of the wheels of the frame A is similar to that of a crawler-type tractor, it being understood that the details of driving the wheels forms no part of the present invention but is merely illustrative of a practical and expedient drive for the mobile frame, it also being clear that suitable actuation of the hydraulic piston and cylinder units 3 under operator control provides steering action in which, as viewed in FIGURE 3, when the wheels to the right hand side of that figure are turned clockwise the rear wheels or other pair turn in a counterclockwise direction about an axis normal to the plane of the drawing. Obviously, when the steering wheel is turned reversely the front wheels turn counterclockwise and the rear wheels turn clockwise about such axis. This provides more than adequate steerability of the vehicle in consideration of the terrain in which it will operate.

FIGURES 13 and 14 illustrate a relationship of the tree delimbing blades and a means for turning the same to active position. As indicated in these figures, the respective blades 34 and 35 have sharpened leading edges as regards the direction of movement of the mobile frame. The pintles which support the blades for horizontal swinging movement are carried by the outermost pair of square-shaped frame elements 24, suitable cross braces 36 being provided to assure that these two square-shaped frame elements move conjointly. On the shaft supporting each blade is a sprocket 37 and supported by a vertically extending pair of frame elements 38 are further sprocket shafts 39. A sprocket chain 40 is trained over each pair of upper and lower sprockets. Centrally located between frame elements 38 is a hydraulic piston and cylinder unit 41, the piston of which carries a cross member 42 the opposite ends of which are coupled to the respective sprocket chains 40. Thus, as apparent from FIGURE 13, when the piston of such unit is extended, the inner run of each chain moves upwards while the outer run moves downwards, thus swinging the respective blades 34 and 35 toward one another so that, depending on the thickness of the tree length being delimbed, these blades will dig into the ground whenever necessary and tightly engage the surface of such tree length, it being understood that when the mobile frame is then moved longitudinally of such length with the traction roller 27 rotating to engage the upper surface of the length the delimbing blades will shear limbs from such felled length. Likewise, the shear blade will delimb the upper surface of the felled length. In the event a limb to be delimbed is of excessive size then the roller 27 is locked stationary and the piston and cylinder units 26 are actuated to extend the outermost square tubing shaped frames 24, and the delimbing blade unit and shear blade carried thereby, forwardly of the mobile frame to shear off such excessive size limb or limbs. Following this, the roller 27 is again driven in the forward direction and the movement of the mobile frame relative to the felled length completes delimbing. Further actuation of the piston and cylinder unit 41 applies additional squeezing force to the delimbing blades to, in effect, sever the top portion of the felled tree length.

In this regard, the sprocket shafts that carry the delimbing blades can be mounted either in suitable bearings provided on the lateral outer sides of the square-shaped tubing or frame elements 24 or, if desired, these square-shaped tubing elements can be notched out and provided with suitable reinforcing plates at longitudinally spaced intervals sufficient to accommodate the bearings and shafts and drive sprockets for the blades.

One important aspect of the present invention, however, resides in the cooperative relationship between the grasping means or hook element D and the shear blade E.

To effect felling, the mobile frame is driven toward a tree with the shear blade and hook-shaped element in the position illustrated diagrammatically in FIGURE 6, in which the leading end 43 of the hook-shaped element is, in effect, pointed at the tree.

With respect to operation, the vehicle is driven toward a standing tree with the shear in inactive condition and the tree-engaging claw or hook extended forwardly so that when the latter strikes the tree it will pivot horizontally about axis X and, due to the camming action, the claw will be around the tree with the shear blade abutting against the side of the tree at ground level that faces the vehicle. Then the claw is retracted and the shear blade is simultaneously extended to sever the tree at ground level. Simultaneously the bar (pusher) is extended to fell the tree directionally in advance of and generally in alignment with the longitudinal axis of the vehicle, the vehicle being backed up before the top of the tree hits the ground, and the butt end of the tree is engaged within the effective claw hammer Y with the sharpened edge S digging into the tree so that when the vehicle is moved from the position where the tree was standing the felled tree is pulled by the vehicle at least approximately the length of the tree away from where it was standing. The butt end of the tree is now in what could be termed bunching position and is still elevated above the ground by the claw hammer.

When the butt end is in the desired bunching position the claw hammer is retracted fully, the last several inches of this stroke initiating a camming action by reason of the arm Z engaging the extended end E of the sub-frame that guides and supports the extension and retraction of the shear and claw hammer, whereupon the claw hammer swings horizontally so that the butt end of the log is brought into contact with the inner face of the vertically extending side member S of the claw hammer, thereby forcing the butt end of the tree to move up toward the rounded end R of the other side member of the claw hammer in a direction away from the sharpened edge SE to disengage the sharpened edges from the tree so that further movement of the vehicle allows the butt end of the log to drop onto the ground. At this position the axis of the felled tree is at a very slight angle to the longitudinal axis of the vehicle but normally it is still within the transverse dimensions of the interior of the wheels of the vehicle so that when the vehicle is moved to straddle the felled tree the inner frame A of the vehicle is depressed to engage the fluted roll on the upper surface of the felled tree adjacent the butt end with such force that the wheels W are elevated above the ground and the semi-circular blades B after extension of the frame carrying the shear and claw hammer are moved to active position that they, in effect, wrap around the trunk of the tree with their sharp leading edges shearing off limbs as the vehicle is moved along the length of the felled tree, positive traction on the tree being effected by engagement of the fluted roll with the tree. Any branches that protrude vertically from the felled tree are sheared by the main shear blade SB. The upper small end of the tree is either sheared or broken off by the force applied to the semicircular shear blades. This severing of the upper end occurs without affecting the positioning of the balance of the felled tree. The time interval between initial contact with a standing tree of a height to have approximately 40 to 50 feet of merchantable length and felling, moving the felled tree to bunching position and delimbing the same by movement of the vehicle along the felled length normally will not exceed 30 to 45 seconds. In other words, from a practical consideration, the apparatus of this invention will provide a felled, delimbed tree in a bunching position approximately every minute. In the terminology of the industry, the machine will fell, delimb and bunch approximately a tree a minute. Obviously, terrain would have an effect on the time so that under ideal conditions a tree a minute is practicable, although this time limit is not to be considered a limiting factor since uneven terrain could lengthen this time interval. In any event, operation of the machine of the invention will not exceed the rate of a tree every two or three minutes under adverse conditions.

After the top of the tree has been severed the fluted roll and the tilting frame are elevated so that the wheels W are back on the ground, the shear blade and claw hammer are retracted and the vehicle proceeds forwardly of the smaller end of the tree to engage and fell the next tree by repetition of the operation of the free swinging claw hammer engaging behind the tree, extension of the shear blade and pushing action of the pusher element so that a second tree is felled and withdrawn to lie in contiguous relation with the first felled tree in bunching position. This operation is repeated until a number of felled trees sufficient to be encompassed by the jaws of the grapple G are in bunched and delimbed condition, whereupon the grapple jaws are closed adjacent the butt ends of the bunch of felled trees, as shown in FIGURE 1d. The A-frame is elevated to lift the now grasped bunch of tree lengths and the vehicle is moved to a position alongside a trailer, as shown in FIGURE 1e, the A-frame being elevated high enough so that the bunch of felled tree lengths are fed through the standards ST of the trailer, as shown in FIGURE 1f. The A-frame is then lowered so that the butt ends of the felled trees remain between the standards, the grapple jaws being released, the vehicle then being moved alongside the trailer, an intermediate portion of the bunch of trees being grasped by the grapple, the A-frame then being elevated and the vehicle manipulated to place the grasped bunch of trees between the standards at the rear of the trailer, as shown in FIGURES 1g and 1h.

The vehicle then proceeds to fell, delimb, bunch and assemble another group of tree lengths which are similarly loaded between the standards of the trailer until a full load is placed thereon. In tree length logging practice the distance between the standards at the rear end of the trailer is less than the distance between the standards at the front end.

During loading of the trailer the front end has its fifth wheel FW on the ground, which places the end of the trailer that receives the butt end of the bunch of felled trees closer to the ground to facilitate movement of the elevated bunch of tress over the trailer for depositing the same between the standards.

There is a pair of fluid actuated jacks (not shown) mounted beneath the front end of the trailer. With the vehicle in the position shown in FIGURE 1h, a quick disconnect coupling is effected between the hydraulic circuit of the vehicle and the circuit of the jacks so that operation of the motor pump combination of the vehicle drives fluid into the jacks to extend them to engage the ground to elevate the front end of the now loaded trailer to a height sufficient to allow the highway tractor to maneuver into position to become coupled with the trailer. Once the loaded trailer has reached the desired height a valve is manipulated to lock the fluid in the jacks, whereupon the quick disconnect hose coupling is removed from the trailer circuit, a valve in the vehicle fluid circuit being closed, and the vehicle resumes its felling, delimbing and bunching operation to gather and load a further bunch of lengths on another trailer.

The trailer has a reservoir thereon so that when the highway tractor is manipulated in a position to engage the trailer the operator thereof can open a valve in the jack circuit allowing the fluid to pass into the tank and then the jacks are raised manually with a small winch and cable arrangement actuated by a hand crank (not shown). When the trailer returns for another load the hydraulic circuitry on the trailer is such that when coupled with the hydraulic circuit on the felling vehicle the fluid is forced from the tank on the trailer back into the main tank on the felling vehicle, there being a suitable connection made for this purpose, and a hand or small air pump being sufficient to drive the fluid from the tank on the trailer back into the main reservoir on the felling vehicle. The capacity of the main reservoir is such that it can operate adequately even if the jack circuits of several trailers have been filled and they are in transit to and from the tree felling location.

Another advantage with the apparatus of this invention resides in the fact that when the trees in a particular location have been felled and the supply of merchantable logs in the location is exhausted the log trailer in empty condition can serve as a transport vehicle for the felling vehicle. To effect this operation, the fifth wheel of the trailer is allowed to remain in contact with the ground as in the log loading position, so that the frame of the trailer is slanted downwardly toward the front. The outside transverse dimension from wheel to wheel of the felling vehicle is approximately 84". The distance between the standards on the front end of the trailer is aproximately 90". Further, these standards are removable. Thus, with the front end of the trailer on the ground the felling vehicle is moved to a position to overlie the rigid square frame SQ shown, for example, in FIGURE 1e. In this position the quick disconnect of the fluid circuit in the felling vehicle is coupled to the jack cylinders of the trailer so that the trailer now carrying the felling vehicle is elevated to a position to be coupled to the highway tractor. The fluid circuits are then isolated, i.e. the circuit of the felling vehicle is closed and the valves in the trailer circuit are so manipulated that when the operator with the highway tractor now connected to the trailer elevates the jacks the fluid from the jacks flows into the tank on the trailer and the highway tractor now coupled to the log carrying trailer which carries the felling vehicle can be moved to another logging location. The fore-and-aft dimensions of the square frame on the log trailer are in excess of the distance between the front and rear axle mountings of the felling vehicle, i.e. that fore-and-aft dimensions are in excess of the felling vehicle. Thus, an adequate support is provided to lift and hold the felling vehicle in elevated condition. To hold the felling vehicle in position on the trailer the A-frame carrying the grapple is manipulated while the grapple jaws are manipulated to pass around and grip the log trailer frame, the fluid being locked in this gripping position so that during transport the felling vehicle, in effect, holds itself on the log trailer, thus eliminating the time involved to assemble chains, clamps or other connections such as normally used when transporting an earth working or logging vehicle on a highway on a trailer.

Another advantage flowing from the structure of the felling, limbing and bunching of this invention resides in the fact that should the vehicle become bogged in the mud, such as having either pair of wheels sunk in the mud, there are two ways in which the felling vehicle can extricate itself from the mud. Depending on the depth of the mud and the location, a felled tree or pole length can be manipulated under the vehicle to underlie the fluted roller, whereupon the frame of the vehicle can be tilted to engage the roller with the pole or felled tree length, the driving motor for the fluted roller being actuated so that, in effect, the fluted roller pulls the vehicle along the pole or felled length to extricate the vehicle, it being understood that all wheels thereof are in driving relation. In this manner terrain otherwise practically impossible to be traversed by the vehicle can be traversed by felling tree lengths with the vehicle and manipulating the felled lengths to lie across the soft or boggy area and then using the fluted roller in depressed position against such felled lengths to provide added traction to draw the vehicle across a boggy area.

Another way that the vehicle can extricate itself from a bogged down condition is by lowering the A-frame, extending the grapple carrying arm, opening the grapple jaws, driving the same into the ground adjacent the shear blade and then retracting on the cylinder coupled to the tree pushing arm to lower that arm relative to the A-frame, and thus push the vehicle a short distance, whereupon the A-frame is elevated, the circuit again operated to drive the grapple into the ground and this lowering and pushing operating being repeated so that, in effect, the vehicle is moved three or four feet per operation until its traction wheels are on stable ground.

This movement of the vehicle by manipulation of the A-frame and tree pushing arm can likewise be effected with the grapple jaws closed about one or more log lengths which, of course, will provide added stability for the pushing force exerted on the vehicle when the felling arm is manipulated to, in effect, push the vehicle away from the point of penetration of the now closed grapple jaws with the ground.

As clear from the several figures, the hook element has a base or plate portion 44 and two front walls 45 and 46, the base being notched out to define an arcuate recess 47. The front wall 45, as shown in FIGURE 4, is slanted downwardly and includes an initial portion of rounded configuration on the top 48 and a further portion having a sharpened upper edge 49. This wall further has another sharpened edge 50 extending upwardly so that between the two edges 49 and 50 there is defined a notch. The other front wall 46 is merely a bracing wall and is not sharpened. The hook is mounted for swinging movement about an axis 51, this axis being provided by a suitable pintle pin arrangement carried at the end of the centrally located square-shaped tube or frame component driven by the piston and cylinder unit 25.

The operation is such that when that piston and cylinder unit 25 is projected forwardly relative to the shear blade so that the pivot axis 51 is located at least slightly in advance of the leading edge of the shear blade the forward movement of the vehicle causes the front wall 45 to engage the front face of the standing tree which, due to the shape of that wall, cams open the hook to present the concave opening 47 in facing relation with the tree. Continued movement of the vehicle causes the nose portion 52 on the opposite side of the pivot axis 51 to engage the tree to swing the hook in the reverse direction so that it surrounds the tree from the reverse side thereof, whereupon the piston and cylinder unit 25 is reversed to apply pulling force on the grasping hook to pull against the rear face of the tree while simultaneously the piston and cylinder units 26 operate to extend the shear blade at the same time as the A frame and boom arm are manipulated to apply the pushing roller 17 against the tree at an upper level. It is thus seen that the tree is engaged at three points, on the upper front face by the roller 17, at the lower level on the rear face by the hook; these forces acting in opposition tending to tension the tree fibers at the same time the shear blade is moved forward.

The supporting and mounting arrangement of the chassis with respect to the mobile frame and the belly pan unit with respect to the chassis is such that when the vehicle is driven toward a tree and approaches tree severing position the cylinder and piston units 6 are actuated to oscillate the chassis to depress the rear end thereof at the same time the belly pan unit control cylinder and piston unit 19 is actuated to depress the belly pan unit carrying the hook and shear with the result that the plane of the shear is substantially parallel to the ground.

Furthermore, it is to be noted that the hook D has an interior opening so shaped that the distance between the opposite extremities of the hook is approximately 22", while the major dimension of the opening is approximately 28". Thus, while in normal position, particularly in southern pine country, the diameter of trees to be harvested seldom exceeds 20", it is possible that it may be necessary to harvest a tree having a diameter approximating 28". In this regard, the rear end of the chassis is depressed to cause the hook to be on an upward incline so that when it is extended and engages a tree it will do so at a height where the diameter is 22 or less inches and the hook can still close at this elevated height. Then the belly pan unit is depressed relative to the chassis which drags the hook down the tree, peeling bark therefrom until it reaches a location where the diameter of the lower portion of the tree is 28". At this point pulling force is exerted on the hook, the shear is extended and the pusher bar actuated to fell the tree, even though it may leave a portion of the stump above the ground.

After the tree is sheared the force applied by pushing roller 17 against the same causes it to fall in the desired direction. Furthermore, the butt end of the felled tree still becomes gripped by the sharpened edges 49 and 50 on the front wall of the hook. This gripping action is such that by elevating the belly pan unit the butt end of the felled tree is lifted, these sharpened edges dig into the butt end of the felled tree so that the mobile frame can be driven in a reverse direction to deposit the felled tree to a bunching location. Upon reaching this location the piston and cylinder unit 25 is fully retracted. This causes the hook to move to a position so that the surface of the short arm thereof denoted at 53 engages a fixed cam element 54 carried by the leading end of the square-shaped frame element 24 to cause the hook to swing clockwise as viewed in FIGURES 5 to 9 to assume the position shown in FIGURE 10. During this swinging action the butt end of a grasped tree length engages the inner surface of the front wall 46 to cause the length to roll upwards along the inclined upper edge of front wall 45 to that it is forced off the sharpened edge portion onto the rounded end portion and then falls to the ground. Once the felled tree is on the ground the direction of movement of the mobile frame is then reversed with the delimbing jaws being actuated to closed condition and the traction roller 30 suitably actuated to effect the delimbing operation.

After the tree is delimbed and the top severed the felled length is manipulated as described hereinafter.

FIGURE 18 illustrates diagramatically a suitable hydraulic circuitry for actuating the various piston and cylinder units incoroprated in the apparatus. In this regard, the circuitry has been presented to provide, in effect, isolated valve controlled circuits for each piston and cylinder unit or set of units operation. This steering control is of a known type, known as Orbitrol, in which oil is drawn from the reservoir via the suction pump illustrated and fed to the Orbitrol unit O which, under driver control, is such that the cylinder-piston units 3 for the left front wheel and right rear wheel work in the same direction while the cylinder-piston units 3 for the right front wheel and the left rear wheel simultaneously operate in the opposite direction, thus providing proper steering control. The piston and cylinder units 6 which rock the chassis about axis 4 are controlled by selector valve V1, the suction pump for this circuit being illustrated at P2. The vaned roll 27 is driven through a tendam arrangement of hydraulic motors M under control of valve V2. In this circuit, pumps P3 are arranged in tandem. These hydraulic motors are reversible and together drive a chain drive mechanism, not shown, which actuates the worm shaft of a worm drive relationship, the worm wheel of which is on the shaft of roll 27. To raise and lower the belly pan frame and its components about axis 18 piston-cylinder unit 19 is in circuit via control valve V3 and its associated suction pump P4. The A-frame that carriers the boom arm is raised and lowered by actuation of piston-cylinder unit 8 via operation of valve V4 and the associated suction pump P5. The boom arm is rocked about the upper end of the A frame by actuation of piston-cylinder unit 11 under control of selector valve V5, having associated pump P6 in the circuit between the unit and the reservoir. The delimbing blade closing cylinder and piston unit 41 is under control of selector valve V6, there being a suction pump P7 in that circuit. The grapple jaws are operated by piston-cylinder unit 16 under control of selector valve V7, there being a pump P8 in that circuit. The extension and retraction of the tree grasping means or hook is controlled by actuation of piston-cylinder unit 25 responsive to actuation of the selector valve V8, there being a pump P9 in that circuit. The actuation of the shear blade is effected by operation of piston-cylinder unit pair 26 controlled by valve V9 and associated pump P10 in that circuit. Therefore, each unit or set of units has its own hydraulic circuit including a pump and selector valves, the selector valves being of the double spool type, known in the art, and the pumps being of the rotary module type that can be assembled in end-to-end relation and driven by a common drive with power being taken off a suitable power take-off shaft of the driving engine of the apparatus. Obviously, a different hydraulic circuitry could be embodided since the details of an adequate hydraulic circuitry to operate the various piston and cylinder units incorporated in the apparatus are subject to variation and form no specific aspects of the present invention, other than to provide a combination in which the various movable operative sub-frame and actuating components of the invention are hydraulically actuated.

What is claim is:

1. In the harvesting of timber by severing a standing tree at least approximately at ground level while exerting a pushing force on the tree to directionally fell the same, the improvements comprising automatically grasping a standing tree at least approximately at ground level, applying a reactionary pulling force in opposition to said first-mentioned pushing force and simultaneously applying a shearing force closely adjacent the level at which said pulling force is applied but acting in the opposite direction with respect thereto whereby, during severing of a tree, said pulling and pushing forces place tree fibers in tension.

2. Apparatus for harvesting timber, comprising a mobile frame, tree felling means carried by such frame and including extendable and retractable and an automatically operable tree engaging and grasping mechanism which opens and closes around the back side of a standing tree to be felled in response to engagement with the front face thereof, a shearing means movable longitudinally of the axis of the frame and relative to said tree engaging and grasping mechanism which simultaneously cooperates with such tree engaging and grasping mechanism as the latter is retracted to exert a shearing force from the front side of such tree at approximately the ground level, and a pushing means for engaging the tree on the front side thereof at a location sufficiently above the level of application of such shearing force to ensure that when the pushing means and shearing means operate simultaneously the tree is felled directionally forward of the mobile frame.

3. Timber harvesting apparatus including a mobile frame, a chassis carried by such frame, a housing structure carried beneath said chassis, horizontal pivot means connecting said housing structure with said chassis for vertical swinging movement with respect thereto, automatically operable tree engaging and grasping means and shearing means carried by said housing structure, means supporting said last two means for longitudinal reciprocating movement with respect to said housing structure and with respect to each other, such last two means being constructed and arranged so that the tree grasping means automatically opens in response to engagement with the front face of the standing tree and then can be reversely moved to pull against the rear face of such tree, while said shearing means moves longitudinally toward such grasping means so that force is applied in opposite directions at approximately the same level to assist in minimizing the shearing force required.

4. Timber harvesting apparatus as claimed in claim 3, further including movable bladed jaw means supported for longitudinal movement simultaneously with any movement of said shearing means, said bladed jaw means also being mounted for movement between opened and closed positions and operative when in closed position to sever limbs from a felled tree length responsive to relative longitudinal movement between said bladed jaw means and said felled length.

5. Timber harvesting apparatus as claimed in claim 3, further including a vaned driven roll carried at the end of said chassis remote from said shearing means and operative to engage the upper surface of a felled length to assist in providing tractive force for moving said mobile frame relative to such felled length.

6. Timber harvesting apparatus as claimed in claim 5, further including means for locking said roll in stationary condition against the upper surface of such felled length to thereby provide a base of reaction to permit extension of said shearing means relative to such mobile frame when the latter is stationary to facilitate delimbing limbs of excessive diameter.

7. Timber harvesting apparatus as claimed in claim 3, in which said tree grasping means comprises a hook-shaped arm mounted for oscillation about a vertical axis lying approximately along the longitudinal axis of said mobile frame, said arm in closed condition having a leading end extending on an arc rearwardly toward such frame, said leading end having a vertical wall adapted to engage the front face of a standing tree to thereby cam open said arm, said arm having a trailing end adjacent the location of the axis about which it swings to engage the front face of such tree to provide an additional camming action to close said leading end of such hook-shaped arm behind the rear face of such tree.

8. Timber harvesting apparatus as claimed in claim 3, and further including a swingable pushing means carried by said chassis and operative to engage the tree and apply pushing force thereagainst at a height above the ground in excess of the vertical dimensions of the apparatus.

9. A tree harvesting apparatus comprising a 4-wheeled mobile frame, a chassis carried by said frame, a sub-frame, means pivotally connecting the sub-frame at one end of said chassis for turning movement about a horizontal axis, force applying means mounted between the other end of said chassis and said sub-frame for applying force thereto in opposite directions to raise and lower the sub-frame relative to the chassis, a driven fluted tree-engaging roll carried at the end of the chassis adjacent said horizontal axis, means for driving such roll in opposite directions, said last-mentioned means also being operative to hold said roll against rotation, a plurality of thrust members carried by said sub-frame for longitudinal movement in opposite directions with respect thereto, a tree-engaging hook means carried by at least one of said thrust members, means pivotally connecting said hook means to such thrust member for turning movement about an axis perpendicular to the line of movement of such thrust member, a shear blade carried by at least one other of such thrust members for movement therewith, force applying means for reciprocating said thrust members with respect to said subframe and with respect to one another, tree delimbing jaws carried by that one of said thrust members that carries said shear blade, whereby with said tree-engaging roll in engagement with the upper surface of a felled tree and said frame moved longitudinally relative to such felled tree said shear blade and delimbing jaws are operative to delimb such tree with said roll insuring sufficient traction force.

10. A tree harvesting apparatus as claimed in claim 9, in which said hook means has a leading end face also extending perpendicular to the line of movement of the thrust member and including converging side portions meeting at an apex, said hook means further including a base supporting said side portions and notched to define a tree accommodating opening, the upper surface of one of said side portions having a notch therein including an upper surface extending downwards from one edge of the hook opening toward the apex and a transversely extending surface portion extending approximately normal to the base, said last-mentioned portion and at least an adjacent portion of the other surface of the notch being sharpened.

11. A tree harvesting apparatus as claimed in claim 9, and an additional frame, horizontal pivot means mounting said additional frame for swinging movement relative to said chassis about a horizontal axis, means for raising and lowering such additional frame, a boom carried by said additional frame, means for swinging said boom about a horizontal axis with respect to said additional frame, the means for swinging said additional frame being connected between said additional frame and said chassis at a location on the side of said horizontal pivot means that is adjacent said shear blade location.

12. A tree harvesting apparatus as claimed in claim 9, in which said delimbing jaws comprise axially spaced curved blades supported for rotation about independent axes parallel to the longitudinal axis of the frame and the curvature and the mounting of said jaws being such that they move toward one another in a delimbing operation and away from one another to an inoperative position.

13. A tree harvesting apparatus as claimed in claim 9, and further including grapple means mounted in depending relation adjacent the end of said boom remote from its point of connection with said additional frame, swivel means connecting said grapple means to said boom, said grapple means including arm members, and means for moving the same toward and away from one another.

14. A tree harvesting apparatus comprising a 4-wheeled mobile frame, a chassis carried by said mobile frame, a sub-frame, means pivotally connecting the sub-frame at one end of said chassis for turning movement about a horizontal axis, force applying means mounted between the other end of said chassis and said sub-frame for applying force thereto in opposite directions to raise and lower the sub-frame relative to the chassis, a driven fluted tree-engaging roll carried at the end of the chassis adjacent said second-mentioned horizontal axis, means for driving such roll in opposite directions, said last-mentioned means also being operative to hold said roll against rotation, thrust means carried by said sub-frame and mounted for longitudinal movement with respect thereto, shear means carried by said thrust means, tree delimbing jaws also carried by said thrust means and means for longitudinally moving said thrust means with respect to said sub-frame in a delimbing operation when said tree-engaging roll engages a felled tree and a large diameter limb is to be removed.

References Cited

UNITED STATES PATENTS

| 2,748,813 | 6/1956 | Ford | 144—34 |
| 3,084,727 | 4/1963 | Basham | 144—34 |

GERALD A. DOST, Primary Examiner

U.S. Cl. X.R.

144—3, 309